3,311,630
PROCESS FOR THE PREPARATION OF QUIN-
ACRIDONE IN FORM OF A PIGMENT
Marco Tessandori, Milan, Italy, assignor to Aziende
Colori Nazionali Affini ACNA S.p.A., Milan, Italy
No Drawing. Filed May 10, 1966, Ser. No. 548,845
5 Claims. (Cl. 260—279)

This application is a continuation-in-part of copending application Ser. No. 322,514, filed Nov. 8, 1963, now abandoned.

This invention relates to a proces for the preparation of quinacridone as a pigment in the beta form.

The importance of the red and red-violet pigments which may be obtained from the linear quinacridone

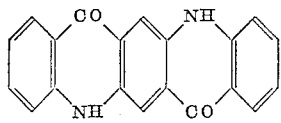

is known. This compound, the preparation of which is described, for instance, by Liebermann (Justus Liebig's Annalen der Chemie 518 (1933), pages 245–249) and in U.S. Patent No. 2,821,529, is characterized by a high stability to chemical and physical agents, which makes it potentially a very valuable pigment. However, its practical use is hindered by the fact that the finishing, i.e. the transformation into a product having a uniform crystalline and finely divided structure, in a form to make it possible to obtain intense and uniform shades, is particularly difficult and costly.

Various methods for finishing quinacridone have been proposed. These include dry milling with inorganic salts, with or without additives which cause the formation of only one crystalline form of the three known crystalline forms of quinacridone, alpha, beta and gamma. Some of these prior proposals may be found, e.g., in U.S. Patents Nos. 2,844,484 (alpha form) 2,844,485 (beta form) and 2,844,581 (gamma form). For instance, a method for obtaining the beta form, which is a very good pigment having a red-violet shade, comprises milling the crude in the presence of inorganic salts and aromatic solvents. While such methods do produce the desired results, they have the disadvantage of requiring high amounts of the inorganic milling salts and long periods of time for the milling operation. They thus have a poor commercial production potential which is furthermore complicated by danger of fire and explosions.

Other prior methods include dissolving the pigment in a suitable solvent and then reprecipitating it. For instance, to obtain quinacridone pigment in the beta form, the crude is dissolved in alcoholic alkalies and the pigment is reprecipitated by dilution with water. Such methods have the disadvantage of using very costly raw materials and often do not give a product fine enough for commercial application.

I have now found a simple and inexpensive process for obtaining a pigment comprising beta quinacridone and having a high dyeing value. This process comprises dissolving the crude quinacridone in methylsulfuric acid ($CH_3$—O—$SO_3H$) and reprecipitating it by dilution with water. No matter what the crystalline form of the starting material, a pigment of pure beta quinacridone is obtained.

Methylsulfuric acid is a known product and may be prepared just prior to use by mixing $SO_3$ and methanol in a molar ratio of 1:1. It is, in other words, an inexpensive, easily supplied solvent. It was already known as a solvent for some chemical products, but its application to quinacridone was not foreseen. It was, furthermore, not possible to foresee that the dyestuff could be obtained as a beta form pigment having a high dyeing value, by solution in methylsulfuric acid followed by reprecipitation with water. For instance, it is known that sulfuric acid can be used to dissolve quinacridone. But when the sulfuric acid solution is poured into water, the alpha form is obtained.

In fact, the pure beta crystal phase cannot be obtained from a methylsulfuric acid solution if even a minor amount of sulfuric acid is present. Thus, if the pigment obtained does not consist of the pure beta crystal phase, but also contains the alpha crystal phase, this is probably because the methylsulfuric acid used in the process is not pure, but contains sulfuric acid. For example, it is impossible to obtain a pure beta crystal phase quinacridone by using equimolar mixtures of $H_2SO_4$+methyl alcohol to prepare the methylsulfuric acid. As is known (see, e.g. Fieser: Advanced Organic Chemistry, Reinhold 1952, page 136), these mixtures give methylsulfuric acid, but an amount of sulfuric acid sufficient to make the formation of the pure beta crystal phase quinacridone impossible always remains present in the equilibrium mixture.

Therefore, in preparing the methylsulfuric acid for use in the present invention, it is important to avoid the formation of free sulfuric acid. Preferably, the methylsulfuric acid is prepared by condensing $SO_3$ with an equimolar amount of methanol or with a slight excess of methanol.

The amount of methylsulfuric acid used in the process of this invention is not critical. It is preferred however, to employ a ratio of at least about 6 parts by weight of the acid for one part of the quinacridone. Preferably, the temperature of the methylsulfuric acid is maintained at about 20 to 30° C.

The crude quinacridone may be obtained from any source and may contain any ratio of the alpha, beta and gamma crystal phases. That is, it may be pure alpha, pure gamma, or a mixture of either or both with beta in any proportion whatever.

The solution of quinacridone in methylsulfuric acid is substantially anhydrous. As soon as the introduction of the quinacridone into the methylsulfuric acid is completed, it is possible to immediately dilute all the mass with water. Then the mass is filtered, washed until a neutral pH is reached, and the pigment is then dried or worked in accordance with the commonly used finishing methods.

The thus obtained pigment, which is in the pure beta form, is characterized by very good dyeing characteristics in all the generally used dye applications. I have also found that the high acidity of the final aqueous suspension causes the dissolution and therefore the removal of many organic and inorganic impurities which are retained in the crude dyestuff. It therefore follows that any chemical treatments for purifying the pigment are unnecessary.

The following examples are given in order to better illustrate the present invention without limiting it.

*Example 1*

1 part of crude quinacridone was introduced, with stirring, into 6 parts of methylsulfuric acid maintained at a temperature between 20 and 25° C. A clear red-violet solution was immediately obtained. This solution was poured into 60 parts of water and the pigment precipitated as red-violet flocks. After agitating for 10 minutes, the mass was filtered, washed with water until a neutral pH was obtained and then dried at 60° C. Quinacridone in the beta crystalline form and having very good dyeing characteristics was obtained.

*Example 2*

32 parts (one mol) of methyl alcohol were introduced into an enamelled vessel. After cooling to —5° C., during about 15 hours, 80 parts (one mol) of sulfuric anhydride ($SO_3$) were added continuously. The temperature was allowed to rise to 20–25° C. 16 parts of crude quinacridone were then introduced. When a complete solution was obtained, the liquid was poured into 1000 parts of water. The thus formed precipitate was filtered and then washed until a neutral pH was reached. The cake, consisting of an aqueous paste of the beta form of quinacridone, was worked to a pigment according to the generally used methods for finishing dyes.

*Example 3*

16 parts by weight of crude quinacridone of which:

One-third is alpha quinacridone
One-third is beta quinacridone
One-third is gamma quinacridone were dissolved under agitation, at 20–25° C., in 112 parts by weight of methylsulfuric acid. After complete solution was obtained, the liquid was poured into 100 parts of water. The thus formed precipitate was filtered, washed to a neutral pH, and dried. Its X-ray diffraction pattern showed the product to be the beta crystal phase of quinacridone, the diffraction pattern being identical to the one described in U.S. Patent 2,844,485.

*Example 4*

16 parts by weight of crude quinacridone (containing about 33% of the alpha crystal phase, 33% of the beta crystal phase and 33% of the gamma crystal phase) were dissolved in 98 parts by weight (1 mol) of 100% of $H_2SO_4$ at a temperature of 20–25° C., and then diluted by dropwise addition of 132 parts by weight (1 mol) of methanol while keeping the temperature at 15° C. After further agitating for 30 minutes, the liquid was then poured into 1000 parts of water. The thus obtained precipitate was filtered, washed and dried. Its X-ray diffraction pattern showed that the product thus obtained was alpha crystal phase quinacridone containing traces of beta crystal phase quinacridone. This shows that the presence of $H_2SO_4$ prevents the formation of the pure beta form.

What is claimed is:

1. A process for the preparation of quinacridone as a pigment in the pure beta form, which process comprises dissolving crude quinacridone in methylsulfuric acid and then reprecipitating the quinacridone with water.

2. The process of claim 1 wherein the crude quinacridone is dissolved at a temperature in the range of about 20° to 30° C.

3. The process of claim 1 wherein the crude quinacridone used consists of a mixture of alpha, beta, and gamma quinacridone.

4. The process of claim 3 wherein equal amounts by weight of the alpha, beta, and gamma quinacridone are present in the crude.

5. The process of claim 1 wherein the ratio of methylsulfuric acid to crude quinacridone is at least about 6:1 by weight.

No references cited.

ALEX MAZEL, *Primary Examiner.*

DONALD DAUS, *Assistant Examiner.*